United States Patent
Endo et al.

(10) Patent No.: US 6,436,543 B1
(45) Date of Patent: Aug. 20, 2002

(54) HIGH-GLOSS, HEAT-RESISTANT PAINT COMPOSITION; A METHOD FOR MANUFACTURING THE HIGH-GLOSS, HEAT-RESISTANT PAINT; A METHOD FOR APPLYING THE HIGH-GLOSS, HEAT-RESISTANT PAINT; AND A HIGH-GLOSS, HEAT-RESISTANT PAINT FILM

(75) Inventors: Yasuhiko Endo, Yokohama; Hisayuki Sakai, Kasugai; Tomio Sakai; Saburou Shimada, both of Nagoya, all of (JP)

(73) Assignee: Institute of Technology Precision Electrical Discharge Work's (JP)

( * ) Notice: Subject to any disclaimer, the term of this patent is extended or adjusted under 35 U.S.C. 154(b) by 8 days.

(21) Appl. No.: 09/711,688

(22) Filed: Nov. 8, 2000

(30) Foreign Application Priority Data

Nov. 9, 1999 (JP) .......................................... 11-317868

(51) Int. Cl.$^7$ ............................. B32B 9/04; B32B 5/16; B05D 3/02; C08L 83/06; C09D 1/00
(52) U.S. Cl. ........................ 428/447; 428/323; 428/332; 427/387; 427/377; 524/858; 524/863; 106/287.16; 106/287.17; 106/287.18; 106/287.19
(58) Field of Search ................................. 524/858, 863; 428/447, 323, 328, 332; 427/377, 387; 106/287.16, 287.17, 287.18, 287.19

(56) References Cited

U.S. PATENT DOCUMENTS 6,214,467 B1 * 4/2001 Edwards et al. ............ 427/407

* cited by examiner

Primary Examiner—Robert Dawson
Assistant Examiner—Michael J Feely
(74) Attorney, Agent, or Firm—McGlew and Tuttle, P.C.

(57) ABSTRACT

It is an object of the present invention to provide a high-gloss, heat-resistant paint composition that can form a paint film having high gloss, hiding power, heat resistance and adhesion, a method for manufacturing the same, a method for applying a high-gloss, heat-resistant paint, and a high-gloss, heat-resistant paint film. The heat-resistant paint composition is prepared by combining inorganic pigment powder having hiding power and a binder solution chiefly consisting of an alcoholic solution of polysilicon alcoxide; the binder solution containing an effective amount of aluminum ingredient; the composition contains 8~50 wt. % of hydrophilic organic solvent having a boiling point of not less than 100° C. and not more than 220° C.; the average particle size of primary particles of the inorganic pigment powder dispersed in the binder solution being not more than 0.3 μm; and the solidified paint film obtained when the composition has been dried and baked contains not less than 60 vol. % of a vitreous matrix formed as the result of solidification of binder content.

15 Claims, No Drawings

HIGH-GLOSS, HEAT-RESISTANT PAINT COMPOSITION; A METHOD FOR MANUFACTURING THE HIGH-GLOSS, HEAT-RESISTANT PAINT; A METHOD FOR APPLYING THE HIGH-GLOSS, HEAT-RESISTANT PAINT; AND A HIGH-GLOSS, HEAT-RESISTANT PAINT FILM

FIELD OF THE INVENTION

The present invention relates to a novel high-gloss, heat-resistant paint composition that can form a paint film that can be applied in one spray coating and one baking and shows a high gloss and a heat resistance up to 800° C. when applied to austenitic stainless steel, a method for manufacturing the high-gloss, heat-resistant paint, a method for applying the high-gloss, heat-resistant paint, and a high-gloss, heat-resistant paint film.

BACKGROUND OF THE INVENTION

Numerous inorganic heat-resistant paints suited for various applications have heretofore been developed and marketed. Major types of such inorganic heat-resistant paints include an inorganic paint using an aqueous solution of aluminum phosphate as a binder solution, an inorganic paint using an aqueous solution of alkaline silicate as a binder solution, an inorganic paint using an alcoholic solution of polysilicon alkoxide as a binder solution (also referred to as so-gel binder), and an inorganic paint using an organic solvent solution of polysilazane as a binder solution.

The paint using an aqueous solution of aluminum phosphate is a corrosion-resistant paint containing a pigment of fine aluminum metal powder, as disclosed in U.S. Pat. No. 3,248,249 and U.S. Pat. No. 5,278,650, for example, which has excellent corrosion-resistant properties based on the sacrificial corrosion preventing effects of aluminum which is oxidized in preference to iron as the base metal. Its heat resistance, however, normally does not exceed 600° C. that is close to the melting point of aluminum. Furthermore, commercially available paints of this type often contain carcinogenic sexivalent chrome, posing environmental concerns.

Although the heat-resistant paint using an aqueous solution of alkaline silicate as a binder solution is inexpensive, high heat resistance cannot be expected from it due to such alkali content as $Na^+$ ion having an effect of lowering melting point. The heat-resistant paint using an organic solvent solution of polysilazane as a binder solution, as disclosed in Japanese Published Unexamined Patent Application Hei-6(1994)-122852, is adapted so that the binder solution of this system that would normally be cured only at high temperatures can be cured at low temperatures, but its applications are limited at present due to its high price.

The heat-resistant paint using an alcoholic solution of polysilicon alkoxide as a binder, on the other hand, can be commercially available at relatively low prices, and a highly heat-resistant paint can be obtained by combining heat-resistant pigments. Japanese Published Unexamined Patent Application No. Hei-6(1994)-9928 discloses a high-gloss, heat-resistant paint having a beat resistance of 500° C., but has no mention of an embodiment of a colored paint having hiding power. Binders comprising an alcoholic solution of polysilicon alkoxide as disclosed in Japanese Published Examined Patent Application No. Hei-5(1993)-33275 and Japanese Published Examined Patent Application No. Hei-8(1996)19352 introduce an $Al_2O_3$ content by adding aluminum alkoxide or alumina sol, both of which are relatively inexpensive, to the binder solution comprising the alcoholic solution of polysilicon alkoxide to improve the adhesion and heat resistance of the paint film.

Commercially available polysilicon alkoxide heat-resistant paints manufactured based on these technologies have a heat resistance exceeding 600° C., and their varnish-like coating film has a gloss. Heat-resistant paints manufactured by combining inorganic pigments having hiding power have no heat resistance exceeding 600° C. (those paints whose coating films tend to peel are defined in this Specification as having no heat resistance despite the fact that their paint film materials are beat resistant), or even if they are heat resistant, their paint films have only a semi-gloss unless their varnish is top coated. Those glossy paint films formed by top coating varnish onto a film containing pigments are thick by the thickness of the top coated film, and tend to peel in a temperature cycle exceeding 600° C. due to the difference in thermal expansion coefficient between the paint film and the base material.

On the other hand, exhaust pipes of motorcycles have heretofore normally been made of carbon steel, to which a corrosion-preventive paint is applied. More recently, however, an increasing number of them are made of stainless steel due to the reduced cost of stainless steel, and as a result, the need for corrosion-prevent coating has been reduced, and there is a growing trend among motor cyclists toward such aesthetically attractive exhaust pipes as coated with glossy paints.

SUMMARY OF THE INVENTION

The present invention is intended to overcome these problems inherent in the prior art. It is therefore an object of the present invention to provide a new high-gloss, heat-resistant paint composition that can be applied to austenitic stainless steel and other materials in one spray coating and one baking to form a paint film having a heat resistance exceeding 600° C. and good adhesion, a method for manufacturing the same, a method for applying the high-gloss, heat resistant paint, and a high-gloss, heat-resistant paint film.

The invention of a high-gloss, heat-resistant paint composition as the first invention employs technical means in which the composition embodying the invention is a heat-resistant paint composition preparedby combining inorganic pigment powder having hiding power with a binder solution chiefly consisting of an alcoholic solution of polysilicon alkoxide; the binder solution containing an effective amount of an aluminum ingredient; the composition containing 8~50 wt. % of hydrophilic organic solvent having a boiling point of not less than 100° C. and not more than 220° C.; the average grain size of primary particles of the inorganic pigment powder dispersed in the binder solution being not more than 0.3 μm; and the solidified paint film produced after the composition has been dried and baked contains not less than 60 vol. % of the vitreous matrix formed as the result of solidification of binder content.

In the present invention, when the average thickness of a paint film that can be obtained by applying the composition to an object being painted is 10 μm, it is easy to add inorganic pigment powder of an amount enough to form a paint film having hiding power.

In another preferred high-gloss, heat-resistant paint according to the present invention, the vitreous matrix produced after the binder solution has been solidified contains 10~45 wt. % of the $Al_2O_3$ content.

In still another preferred high-gloss, heat-resistant paint according to the present invention, the inorganic pigment powder comprises primary particles of oxides having an average particle size of not more than 0.2 μm.

In still another preferred high-gloss, heat-resistant paint according to the present invention, the hydrophilic organic solvent comprises alcohols.

In still another preferred high-gloss, heat-resistant paint according to the present invention, 2~10 wt. % of the inorganic pigment having hiding power is replaced with ultrafine alumina powder having primary-particle sizes of not more than 35 nm.

The invention of manufacturing method as the second invention employs technical means in which a mixture obtained by adding a hydrophilic organic solvent of a boiling point of not less than 100° C. and not more than 220° C. to inorganic pigment powder having hiding power, in which primary particles of an average particle size of not more than 0.3 μm is treated with dispersing means to produce slurry in which primary particles of inorganic pigment powder are dispersed in the hydrophilic organic solvent; the slurry being mixed with a binder solution chiefly comprising an alcoholic solution of polysilicon alkoxide.

In a preferred method for manufacturing a high-gloss, heat-resistant paint composition, an effective amount of dispersant is added to a mixture of a hydrophilic organic solvent and inorganic pigment powder.

A painting method as the third invention employs technical means in which the surface of an object being painted is blast-finished with hard particles of a particle size equal to, or finer than 270 mesh, and a heat-resistant paint composition is obtained by mixing slurry produced by mixing inorganic pigment powder having hiding power, whose primary particles have an average particle size not more than 0.3 μm, with an alcoholic solution of polysilicon alkoxids containing an effective amount of an aluminum ingredient; the heat-resistant paint composition being spray coated on the surface of the object being painted; and the spray-coated object being heated to a temperature of not less than 100° C. and not more than 400° C. to form a paint film of an average film thickness of not less than 4 μm and not more than 20 μm on the surface of the object being painted.

In a preferred method for applying a high-gloss, heat-resistant paint according to the present invention, humidity in a booth in which spray coating is carried out is kept at not more than 65%.

In another preferred method for applying a high-gloss, heat-resistant paint according to the present invention, dry hot air is blown over the object being painted immediately after spray coating to quick-dry the surface of the paint film, which is then heat-cured.

The invention of a paint film as the fourth invention employs technical means in which a paint film is obtained by applying a heat-resistant paint composition to the surface of an object being painted by spray coating; the surface of the object being painted blast-finished with hard particles of a particle size equal to or finer than 270 mesh; the paint film being a single-coat film of an average thickless of not less than 4 μm and not more than 20 μm; the paint film comprising the vitreous matrix obtained after a binder solution consisting of an alcoholic solution of polysilicon alkoxide containing an effective amount of aluminum has been solidified, an inorganic pigment powder having hiding power consisting of the primary particles of an average particle size of not more than 0.3 μm dispersed in the matrix; the vitreous matrix occupying not less than 60 vol. % of the paint film; and the gloss value of the paint film as measured at the reflection angle of 60° being not less than 30%.

In a preferred high-gloss, heat-resistant paint film according to the present invention, the object being painted is made of austenitic stainless steel.

In another high-gloss, heat-resistant paint film according to the present invention, the object being painted is a blast-finished 1 mm-thick SUS304 stainless steel sheet; after the object being painted to which the heat-resistant paint composition has been applied and heat-cured has been kept at 650° C. for 6 hours in an electric furnace in an air atmosphere and allowed to cool, the gloss value of the heat-resistant paint film as measured at the reflection angle of 60° is not less than 25 %; and the paint film has such a good adhesion that no peeling that is visible to the naked eye occurs on the paint film when the object being painted is bent about 90 degrees.

DETAILED DESCRIPTION OF THE INVENTION

In the high-gloss, heat-resistant paint composition of the present invention, when the content of high-boiling hydrophilic organic solvent is less than 8 wt. %, no high-gloss paint film can be formed stably under high humidity conditions because the paint film is so sensitive to humidity in the atmosphere of the application site of the paint that dew condensation tends to occur on the surface of the paint film as the paint film is cooled by the evaporation heat caused by the vaporization of low-boiling solvent. When the content of high-boiling hydrophilic organic solvent exceeds 50 wt. %, on the other hand, the paint tends to sag during application because the viscosity of the paint becomes too low owing to the high content of solvent. Low-boiling alcohols are derived from the starting material, such as ethyl silicate and aluminum-isopropoxide, in the polysilicon alkoxide binder solution. The content of high-boiling hydrophillic organic solvent should be 8~50 wt. %, or more preferably 10~40 wt. %.

When the viscosity of the paint is low, low-boiling alcohol can be removed through vaporization under reduced pressure to increase the viscosity of the paint and the content of the high-boiling hydrophilic organic solvent.

The inorganic pigment powder used for the composition of the present invention must have heat resistance and hiding power. In the present invention, hiding power is defined as the function for a pigment to make the base material invisible, or for a paint film to substantially mask the base material. In the paint composition of the present invention, the use of a pigment having good hiding power can impart gloss, hiding power and adhesion to a paint film of 4 μm in thickness.

Since no pigments containing organic matter capable of withstanding a high temperature exceeding 600° C. are commercially available, inorganic pigments are used as pigments. It is desirable that pigments heat-treated at a temperature higher than the intended service temperature be used because those pigments heat-treated at higher temperatures are more stable at temperatures lower than them. Since the finer the pigment powder the more quickly its sintering proceed, inorganic pigments heat-treated at high temperatures normally form secondary particles because finer primary pigment particles tend to be agglomerated. When a pigment powder comprising secondary particles whose particle size is of the order of μm is mixed in a paint, gaps of a size corresponding to the particle size of the pigment secondary particles are formed among the secondary particles.

When an alcoholic solution of polysilicon alkoxide is solidified after its alcohol and organic contents have been evaporated, on the other hand, the volume of the composition is reduced to about a tenth of the original volume, and the gaps among the secondary particles are left in the paint film as pores of a size larger than the wavelengths of visible light rays. These pores scatter visible light rays, leading to a loss of gloss on the paint film. The present inventor, et al. attributed the loss of gloss to that these pores, not only of sizes larger than the wavelengths of visible light rays (the shortest wavelength of visible light rays is 0.4 $\mu$m) but also of slightly smaller sizes, that is, sizes close to the wavelengths of visible light rays, reflect visible light rays diffusely.

The present inventor et al. consider that gloss can be imparted to a paint film by reducing the size of pores in the paint film to a size considerably smaller than the wavelengths of visible light rays, and discovered after tests that gloss can be given to a paint film by using pigment powder having primary particles of an average size not larger than 0.3 $\mu$m and dispersing it in such a manner that a large proportion of the pigment powder is reduced to a powder of primary particles. The present inventor et al. also found that gloss is lost if the mixing ratio of pigment powder is too high, and that it is effective in maintaining a good gloss to reduce the volume of pigment powder in the paint film in the state after the paint is solidified to not more that 40 vol. %, the remainder volume being occupied by the solidified matter of the binder solution. The mixing volume ratio of pigment powder should preferably be not more than 33 vol. %.

With a light-colored pigment having lower hiding power, it is desirable to mix a larger quantity of such a pigment because the base material tends to be seen through it. To prevent the base material from being seen through, the mixing volume ratio of such a light-colored pigment should preferably be not less than 15 vol. %. The use of pigment powder having high hiding power can reduce the required amount of the pigment powder, resulting in improved gloss on the paint film. Darker-colored pigments normally have high hiding power. The volume percentage of pigment particles in a paint film can be calculated from the weight and specific gravity of the vitreous matrix and the mixing volume and specific gravity of the pigment. An approximate volume percentage of pigment particles can be known by observing the fractured surface of the paint film.

When pigment powder comprising secondary particles is used, the pigment should preferably be dispersed in the state of slurry where the pigment is mixed with solvent. The average particle size of primary particles of inorganic pigment powder should preferably be not more than 0.2 $\mu$m, or more preferably not more than 0.15 $\mu$m. The average particle size of primary particles can be measured from SEM and other micrographs. If the specific surface area of primary particles as determined by the adsorption method and the specific gravity of the pigment are known, it can be calculated by assuming the particle shape. With spinel-based inorganic pigment powder, a cube shape, for example, is assumed.

Inorganic pigment powder of an amount enough to form a paint film having hiding power when the average thickness of a cured paint film is 10 $\mu$m should preferably be contained in a paint composition. When the average thickness of a paint film is less than 20 $\mu$m, or more preferably less than 10 $\mu$m, a good paint film adhesion can be maintained.

An alcoholic solution (normally containing much of the low-boiling alcohol) of polysilicon alkoxide containing an aluminum ingredient is used as the binder solution to maintain adhesion and heat resistance. Too low the aluminum ingredient could not bring about an effect of improving both adhesion and heat resistance, while too high the aluminum ingredient could spoil the gloss of the paint film due to an increase in the viscosity of the binder solution. For this reason, the aluminum ingredient in the vitreous matrix after the binder solution has been solidified should preferably be 10~45 wt. %, or more preferably 15~40 wt .%. The aluminum ingredient is usually introduced in the form of alumina sol or aluminum alkoxide. The binder solution, when solidified, becomes a vitreous solid body comprising $SiO_2$ and $Al_2O_3$, forming a matrix filling the pores between pigment particles in the paint film.

Blast-finishing the surface of an object being painted could improve the adhesion of the paint film. If the blast-finished surface is coarse, however, a coating film as thin as about 10 $\mu$m could damage the gloss because the irregularities on the surface of the base material is replicated on the surface of the paint film. Since the thinner the thickness of the paint film the tougher becomes the paint film against peeling due to temperature cycles. A fine surface roughness of the base material should be obtained by blast finishing using grit of a particle size equal to, or finer than 270 mesh, so that a gloss can be obtained on the final paint surface of a thickness of 4~20 $\mu$m. More preferably, grit of a particle size finer than 300 mesh should be used. Among various types of hard particles, including sand, shot and grit, a type of grit having sharp corners produced by grinding metal particles (shots) can be used.

It is preferable to maintain the pressure of compressed air for blasting at not less than 3.5 atmospheric pressure so as to complete blasting in a short period of time. Too high an air pressure, however, could break up grit, shortening the life of grit. The air pressure should therefore be kept below 6 atmospheres. Etching can be used to finish the surface of the base material, but blasting can yield a paint film having better adhesion. To ensure a glossy paint film at all times, the average thickness of the paint film should be not less than 4 $\mu$m. If the average thickness of the paint film is larger than 20 $\mu$m, on the other hand, thicker portions tend to be produced on part of the paint film, increasing the likelihood of peeling when exposed to temperature cycles. A more preferable average thickness of the paint film is 5~15 $\mu$m.

When a paint film is formed by applying a paint to a base material having flat and curved surfaces, and the paint film obtained has a gloss value as measured at the reflection angle of 60° (pursuant to JIS Z 8741 which also corresponds to ISO 2813) of not less than 30% on an average, the paint film is observed having a gloss by the naked eye. Thus, it was specified that the average gloss value of a cured paint film should be not less than 30%. The higher the gloss value of a paint film the more aesthetically attractive paint film can be obtained. Consequently, a preferable gloss value is not less than 35%, or more preferably not less than 40%. Since dust or other foreign matter adhering to a high-gloss paint film may be offensive to the eye, some kind of measure for preventing dust from adhering to the paint film must be taken during application.

A commercially available binder chiefly consisting of polysilicon alkoxide containing an effective amount of an aluminum ingredient contains large amounts of methyl alcohol, ethyl alcohol, isopropyl alcohol and other volatile low-molecular alcohols as derived from methyl silicate, ethyl silicate, aluminum isopropoxide, etc. which are the starting materials used.

This type of binder solution is usually diluted using isopropyl alcohol (boiling point: 97.154° C.), and has a high content of low-molecular alcohols. When the binder solution is evaporated, the surface of the paint film will be cooled by evaporation heat, often causing moisture in the air to condensate. In such a case, the binder components might react with the condensate to generate gel, which would roughen the surface of the paint film, damaging the gloss of the paint film. If most part of the solvent in a binder solution is low-boiling solvent, a glossy paint film cannot be obtained stably unless the paint is applied in a dry atmosphere of not more than 60% in humidity.

The present inventor et al. discovered that addition of hydrophilic organic solvents having boiling points of not less than 100° C. and not more than 220° C., such as isobutanol (boiling point: 108° C.), propargyl alcohol (boiling point: 113.6° C.), n-butanol (boiling point: 117.5° C.), butyl acetate (boiling point: 127° C.), ethyl cellosolve (boiling point: 136° C.), propyl cellosolve (boiling point: 150° C.), butyl cellosolve (boiling point: 171.2° C.), ethylene glycol monoacetate (boiling point: 188° C.), 2-ethoxyethyl acetate (boiling point: 156.8° C.), and ethyldiglycol (boiling point: 202.7° C.), to a paint composition is effective in controlling the evaporation of organic solvent to prevent dew condensation on the surface of the paint film, and forming a glossy paint film with good reproducibility.

If the evaporation speed of organic solvent is sufficiently slow, the sprayed paint solution migrates on the base material (the leveling phenomenon) to form a smooth paint film surface, contributing to an improvement in the gloss of the paint film. Among the above-mentioned hydrophilic organic solvents, alcohols are desirable because they are relatively inexpensive and have good dispersion properties for inorganic pigments. The hydrophilic organic solvent to be added to the composition should preferably be the one having a boiling point of not less than 110° C. More preferably, ethyl cellosolve should be added to the paint composition because ethyl cellosolve has good pigment dispersing properties and emits less odor, and therefore the paint film of the paint composition containing ethyl cellosolve normally has a good gloss.

The viscosity of a paint composition, which varies with the temperature of the solution, is adjusted by changing the mixing volumes of the solvent and pigments. If the viscosity becomes too high, the gloss of the paint film would tend to deteriorate, while too low the viscosity would cause the paint to sag. Since sagging spoils the external appearance of the paint film, and sagged paint-film areas tend to peel, it is preferable to carefully adjust the viscosity of the paint before application.

The dispersant has functions to stabilize the pigments dispersed in the solvent in the state they are dispersed, and to improve the gloss of the paint film.

Which dispersant be used from among a large number of commercially available dispersant products should be determined by the paint manufacturer himself more or less on a trial-and-error basis, while recommendations by the makers of additives can be used as useful information. Generally speaking, the use of well-dispersed ultrafine pigment powder or body color can enhance the gloss of a paint film, but it is not so easy to predict the possible effects of such well-dispersed pigment powder or body color because the resulting increase in the viscosity of the composition may deteriorate the gloss of the paint film.

In the present invention, ultrafine particles of nanometer (nm) sizes (below the order of not more than 10 nanometers) that do not substantially scatter visible light rays are transparent and colorless in a paint film, as in the case where alumina colloidal particles are added, and the gloss of the paint film can be improved without the sacrifice of the heat resistance and color tone of the film by replacing part of the pigments with dispersed alumina ultrafine powder. Too large the amount of replacement with ultrafine aluminum particles could reduce the hiding power of the paint film, and impair the heat resistance and color tone of the paint film. The amount of replacement with ultrafine aluminum powder should therefore be not more than 10 wt. %, and not less than 2 wt. % since too small the amount of replacement could not achieve the expected effect of improving the gloss. The most preferable amount of replacement should be 3~6 wt. %. The reason why the primary particles size of ultrafine aluminum powder to be replaced was set to not more than 35 nm in the present invention is to avoid the whitening tendency of the paint film after application due to the presence of the ultrafine powder possibly remaining as secondary particles.

As the alcoholic binder solution chiefly consisting of polysilicon alkoxide, with a curing catalyst mixed, has a short pot life. The curing catalyst and the binder solution are normally stored in separate containers, and used by mixing them on the day they are used. Even the binder solution to which the catalyst was added can be used on the next day or a week after preparation so long as it is stored in a refrigerator. The same applies to the paint composition prepared by dispersing and mixing pigments in the binder solution.

In the method for manufacturing a high-gloss, heat-resistant paint according to the present invention, a high-boiling hydrophilic organic solvent and inorganic pigment powder are first mixed, and then the pigment powder slurry is dispersed. By doing this, the dispersed inorganic pigment powder can be stored in the form of slurry. The binder solution and the curing catalyst are first mixed, and then the pigment powder slurry is mixed to the mixture to obtain the paint composition. Thus, the storage life of the paint composition can be remarkably extended by storing three components separately.

By preparing in advance dispersed inorganic pigment powder slurries of different colors, the binder solution to which a curing catalyst was added can be used effectively for specific pigment slurries. Moreover, by adding an effective amount of dispersant to the mixture of the hydrophilic organic solvent and the inorganic pigment powder, the subsequent addition of dispersant can be eliminated. Thus, the dispersant helps facilitate the dispersion of the pigment powder during dispersion process, and the dispersed pigment powder slurry can be stored in a stable dispersed state.

In the method for coating a high-gloss, heat-resistant paint according to the present invention, immediately after the paint is applied to an object being painted by spray coating, the object is dried and heated at a temperature of not less than 100° C. and not more than 400° C. to bake the wet paint so as to form a paint film of an average thickness of not less than 4 $\mu$m and not more than 20 $\mu$m. The maximum baking temperature should preferably be a temperature higher than the boiling point of the hydrophilic solvent used. To ensure the stable formation of high-gloss paint films, humidity in the painting booth should be kept at not more than 65%, or more preferably not more than 60%.

The initial drying of a paint film by blowing dry hot air onto the wet film surface immediately after application rapidly turns the surface of the paint film into a half-dried state, with the result that condensation on the surface of the paint film is inhibited even when the painted object is subsequently moved in a more humid atmosphere. Thus, a good gloss can be imparted to the cured paint film even when spray coating is carried out in a booth where humidity is relatively high.

With the high-gloss, heat-resistant paint film according to the present invention, the surface of an object being painted has a coarseness equal to that obtained by blasting the surface with grit of a particle size equal to, or finer than 270 mesh, and the paint film obtained is a single-coat one having an average thickness of not less than 4 μm and not more than 20 μm, which comprises a vitreous matrix obtained by solidifying the binder comprising an alcoholic solution of polysilicon alkoxide containing an effective amount of an aluminum ingredient and an inorganic pigment powder comprising primary particles of an average particle size of not more than 0.3 μm dispersed in the matrix; the vitreous matrix accounting for not less than 60 vol. % of the volume of the paint film; and the gloss value of the paint film as measured at the reflection angle of 60° being not less than 30%.

Furthermore, the object being painted should be made of hard-to-rust aluminum or austenitic stainless steel. More preferably, a paint film having a heat resistance as high as 800° C. can be obtained by using heat-resistant austenitic stainless steel for the base material.

According to the present invention, when an object being painted made of a 1 mm-thick SUS304 stainless steel sheet blast-finished under the aforementioned conditions was coated with a heat-resistant paint composition by spray coating, heat-cured, and held at 650° C. for six hours in an electric furnace of an air atmosphere, the cooled paint film had a gloss value of not less than 25% at the reflection angle of 60 degrees. Then, when the same SUS304 stainless steel sheet was bent about 90 degrees (with the paint film facing the external convex side), the paint film has such a good adhesion that no peeling visible to the naked eye was found on the film. Moreover, even when a cellophane adhesive tape (hereinafter referred to as "adhesive tape") was applied to the painted film facing the convex side and then removed, no peeling visible to the naked eye was observed on the film.

In the following, specific embodiments of the present invention will be described in detail, but the present invention is not limited to the following embodiments.

EXAMPLE NO. 1

Comparison No. 1

Daipiroxide TM Color #3550 black pigment (an oxide pigment of spinel type having a specific surface area of about 45m²/g and primary particles of an average particle size of about 0.05 μm) manufactured by Dainichi Seika Color & Chemicals Mfg. Co., Ltd was used as the pigment, Heatless Glass GS600-2 (chiefly consisting of an alcoholic solution of polysilicon alkoxide that becomes a vitreous solid body of about 20 wt. % containing about 40 wt. % of $Al_2O_3$ content when dried and solidified) marketed by Nikko Co., Ltd. was used as the binder, and n-butyl alcohol was used as the dispersion medium.

A mixture made by adding 4.5 parts by weight of the dispersion medium to one part by weight of the pigment was placed in a 500-ml polyethylene wide-mouthed bottle, together with a 800-g ball mixture made by mixing 5-mm dia. and 3-mm dia. zirconia balls (YTZ Balls manufactured by Nikkato Co., Ltd.) at the ratio of 1:1 by weight (the charged amount of the mixture of the pigment and the dispersion medium was lower than the level of the zirconia balls), and then the pigment was dispersed by rotating the wide-mouthed bottle in the vertical direction at 70 rpm for 16 hours to obtain a large falling distance of balls.

Next, the principal ingredients of the binder and the hardener were mixed at the ratio of 3:1 by weight in a 100-ml polyethylene wide-mouthed bottle and allowed to stand for two hours for aging at the room temperature of 23° C. 5 g in net of the aforementioned pigment (27.5 g of the dispersed slurry) was then added to 40 g of the aged binder solution, and mixed for about 1 minute in a homogenizer (PT1200C made by Kinematika of Switzerland) to obtain a black-colored heat-resistant paint composition (containing 33.3 wt. % of n-butyl alcohol).

Six smooth-surfaced base sheets, measuring 1 mm in thickness, 100 mm in length and 50 mm in width, of SUS304 stainless steel (austenitic stainless steel) were degreased by wiping the surfaces with acetone, and the degreased surfaces of three sheets of the six base sheets were blast-finished using 320-mesh alumina grit at an air pressure of 4.5 atm. These sheets were used as the painted samples of "Example 1." The remaining three sheets were coated with the paint without blast finish. These were used as painted samples of "Comparison 1."

The heat-resistant paint composition was filtered with a 200-mesh screen to remove foreign matter, and applied by spray coating to these "Example 1" and "Comparison 1" of SUS304 stainless steel sheets. Temperature in the spraying booth was 23° C. and humidity was 63%. The painted base sheets were placed in a drying oven held at 100° C. for an hour to heat-cure the paint film. The paint-film thickness measured for the painted samples (using Elcometer 245N marketed by Coatech Co., Ltd. The same applies hereinafter.) was about 5 μm on an average of three measuring points on each sample. The gloss value measured (an average of measurements at three points using Minolta Co.'s GM-60 conforming to JIS Z 8741. The same applies hereinafter.) for the paint film of each painted sample at the reflection angle of 60° was 42% for "Example 1" samples and 59% for "Comparison 1" samples, respectively.

Next, one of the three painted samples each was placed in an electric furnace and held at 650° C. in an air atmosphere for six hours. The gloss values of the paint films of the painted samples measured after cooling were reduced to 32% and 37%, respectively, but all of them maintained a good gloss at least to the naked eye.

When two sheets of the heat-treated painted samples were bent about 90 degrees by hand (with the paint film facing the convex side), no peeling was observed on the blast-finished painted samples of "Example 1," while partial peeling was found on the paint films of the bent sheets in the unblasted painted samples of "Comparison 1."Adhesion test results using adhesive tape indicate that no peeling was found on the painted samples of "Example 1," while part of the paint films were found peeled and adhering to the adhesive tapes on the painted samples of "Comparison 1," showing that adhesion performance is poor.

EXAMPLE NO. 2 AND EXAMPLE NO. 3

Pigment slurry of Example 2 was obtained in the same manner as in Example 1, except that a mixture obtained by adding 4 parts by weight of ethyl cellosolve to 1 part by weight of pigment was dispersed using ethyl cellosolve (a kind of alcohol which is also called ethylene glycol monoethyl ether) as the dispersion medium. The pigment slurry of Example 3 was obtained by dispersing the mixture of the same composition as in Example 2, to which 0.8 wt. % of BYK110 (manufactured by BYK Chemie Co., Ltd.) was added as a dispersant (when a dispersant is added, the dispersion medium must be reduced by that amount. The same applies hereinafter.).

Next, Ceramica G92-6 (a two-component binder solution chiefly consisting of polysilicon alkoxide; when a mixture of the principal ingredient and a hardener mixed at the ratio of 3:2 is dried and solidified, an about 20 wt. % of solid body is obtained. This solid body is vitreous and contains about 30 wt. % of $Al_2O_3$.) Manufactured by Nippan Research Laboratories Co., Ltd. was used as a binder solution. 5 g each in net of the aforementioned pigments (25 g each of the pigment slurries) were added to 40 g each in net of the aged binder solution, and the mixtures were mixed with the homogenizer for about one minute to obtain the paint compositions (containing about 30 wt. % of ethyl cellosolve) of Examples 2 and 3. Both the paint compositions were applied to SUS304 stainless steel base sheets in the same manner as with Example 1 (the temperature in the painting booth was 20° C., and humidity was 55%), the painted base sheets were baked at 200° C. for 30 minutes to obtain the painted samples of Examples 2 and 3.

The thicknesses of the paint films of the painted samples were measured to obtain the average values. The average paint-film thickness was 5 $\mu$m for Example 2 and 6.2 $\mu$m for Example 3. The gloss value at the reflection angle of 60° was 35% and 50% for Examples 2 and 3, respectively. The gloss value of the painted samples which were heated at 650° C. for six hours and allowed to cool was 32% and 36% for Examples 2 and 3, respectively. Next, the base sheets of both the painted samples were bent about 90 degrees by hand (with the paint film facing the concave side. The same applied hereinafter.), and peeling tests were conducted on the paint films at bends using the adhesive tape. No paint films were found peeled on both the painted samples.

EXAMPLE NO. 4 AND EXAMPLE NO. 5

Paint compositions (containing about 30 wt. % of butyl cellosolve or ethyl glycol acetate) of Examples 4 and 5 were obtained in the same manner as with Example 3, except that butyl cellosolve (for Example 4) and ethylene glycol monoacetate (for Example 5) were used as the pigment dispersion medium. Both the paint compositions were applied by spray coating to SUS304 stainless steel base sheets in the same manner as above in a painting booth (temperature in the booth: 22° C. and humidity: 60%). After the painted samples were heat-cured at 200° C. for 30 minutes, The average film thickness measured for the painted samples was 4.5 $\mu$m for Example 4 and 7 $\mu$m for Example 5. The average gloss value measured at the reflection angle of 60° was 40% for Example 4 and 36% for Example 5.

Next, the gloss values at the reflection angle of 60° were measured on the painted samples, which were heated to 650° C. in an electric furnace having an air atmosphere, held at that temperature for six hours, and allowed to cool. The average gloss value was 32% and 26% for Examples 4 and 5, respectively. No paint films were found peeled on the base sheets of both the painted samples when bent about 90 degrees by hand. In another peeling test where an adhesive tape was applied onto the bends of the same painted samples and peeled, no paint-film peeling was observed on any of the painted samples.

EXAMPLE NO. 6

A paint composition (containing about 33 wt. % of 2-ethoxyethyl acetate) of Example 6 was obtained in the same manner as with Example 3, except that 2-ethoxyethyl acetate was used as the pigment dispersion medium, and 4.5 parts by weight of 2-ethoxyethyl acetate was added to 1 part by weight of pigment. This paint composition was applied by spray coating to SUS304 stainless steel base sheets in the same manner as with Example 3 (the temperature in the painting booth during application was 22° C. and humidity was 60%.)

The film thickness of this painted sample was 7.5 $\mu$m and the gloss value at the reflection angle of 60° was 33%. Next, the painted sample was heated to 650° C. in an electric furnace, held at that temperature for six hours, and then allowed to cool. The base sheet of the painted sample were bent about 90 degrees, but no paint films were found peeled. In the peeling test where adhesive tape was applied to the bend, and no paint film peeling was found.

EXAMPLE NO. 7 AND EXAMPLE NO. 8

A paint composition of Example 7 and a paint composition (containing about 10 wt. % of ethyl cellosolve) of Example 8 were obtained in the same manner as with Example 3, except that Daipiroxide #9320 (a spinel type green pigment having an average primary particle size of about 0.2 $\mu$m) manufactured by Dainichi Seika Color & Chemicals Mfg. Co., Ltd. and #9421 (a spinel type blue pigment having primary particles of an average particle size of about 0.3 $\mu$m were used as pigments, and each pigment and ethyl cellosolve were mixed at the ratio of 1:1 for dispersion processing, and 10 g of dispersion slurry was added to 40 g of the binder solution.

Both the paint compositions were applied on SUS304 stainless steel base sheets in the same manner as with Example 3 in a booth (temperature: 25° C., humidity: 65%), and heat-cured at 200° C. for 30 minutes to obtain three pieces each of painted samples of Examples 7 and 8. The paint-film thickness was about 7 $\mu$m for Example 7 and about 8 $\mu$m for Example 8, and the gloss value at the reflection angle of 60° was 38% for Example 7 and 31% for Example 8. The gloss value measured on a sheet each of the painted samples that was heated at 650° C. for six hours and allowed to cool was 32% and 26% for Example 7 and 8, respectively. Next, the heated painted samples were bent about 90 degrees by hand, but no peeling was observed on the paint film of the painted samples. No paint-film peeling was observed in peeling tests using adhesive tape on the bends of the painted samples.

EXAMPLE NO. 9

The paint prepared in Example 7 was stored in a refrigerator held at about 4° C., and taken out of it after a week and brought to room temperature. Then, the paint was applied by spray coating to three base sheets of SUS304 stainless steel in the same manner as with Example 7 in a humid booth (temperature: 24° C., humidity: 75%). Immediately after application, warm air was blown to the painted surface by a drier and dry-air cured at 200° C. for 30 minutes. The paint-film thickness of the painted samples obtained was about 8 $\mu$m and the gloss value at the reflection angle of 60° was 37%. One of the painted samples was heated to 650° C. for six hours in an electric furnace. The gloss value measured on the painted sample that was allowed to cool was 32%. On the sample bent about 90 degrees by hand, no paint-film peeling was observed. In peeling tests using adhesive tape, no film peeling was found on it.

EXAMPLE NO. 10

A paint composition of Example 10 was obtained by preparing pigment slurry in the same manner as with Example 3, except that 10 wt. % of black pigment was replaced with Nano Tek γ-alumina powder (having an average particle size of 32 nm), manufactured by C. I. Kasei Co., Ltd., and mixing 25 g of the pigment slurry to 40 g of the binder solution. This paint composition was applied by spray coating to three base sheets of SUS304 stainless steel that were degreased and blast finished with 320-mesh grit in a booth (temperature: 27° C. and humidity: 62%), heat-cured at 200° C. for 30 minutes and allowed to cool. The average paint-film thickness of the cooled painted samples was about 6 μm and the gloss value of the paint film at the reflection angle of 60° was 63%. One of the painted sample was heated to 650° C. for six hours and allowed to cool. The gloss value of the cooled sample was 42%. After heating the base sheet of the painted sample was bent about 90 degrees, no peeling was found on the paint film. No peeling was also found on the paint film in the peeling test using adhesive tape.

Comparison No. 2

A paint composition of Comparison 2 was obtained in the same manner with Example 7, except that black pigment (an oxide pigment having an average particle size of 1.1 μm) manufactured by Asahi Chemical Industry Co., Ltd. was used as pigment. This paint composition was applied by spray coating to base sheets of SUS304 stainless steel in the same manner as with Example 7 in a booth at a temperature of 28° C. and humidity of 60%. The paint-film thickness and the gloss value at the reflection angle of 60° measured after baking them at 200° C. for 30 minutes were about 10 μm and 20%, respectively.

Comparison No. 3

Painted samples of Comparison 3 were obtained in the same manner as with Example 3, except that three base sheets of SUS304 stainless steel were blast-finished with 220-mesh grit, and spray coated in a booth at a temperature of 22° C. and humidity of 56%. The paint-film thickness and gloss value at the reflection angle of 60° measured after baking them at 200° C. for 30 minutes were about 8 μm and 2%, respectively. The reduced gloss value of the paint film is attributable to the fact that irregularities on the base sheets were replicated on the paint-film surface.

Comparison No. 4

A paint composition of Comparison 4 was obtained in the same manner as with Example 7, except that twice the amount (20 g) of pigment slurry was added to 40 g of the binder solution. This paint composition was applied by spray coating to base sheets of SUS304 stainless steel in the same manner as with Example 7 in a booth at a temperature of 25° C. and humidity of 58%. The paint-film thickness and gloss value at the reflection angle of 60 degrees measured on the painted samples that were baked at 200° C. for 30 minutes and allowed to cool were about 10 μ/m and 24%, respectively. The volume ratio of the vitreous matrix in the paint film at that time was 56 wt. % (the calculation was based on the assumption that the specific weight of the vitreous matrix was 2.5 and that of the pigment was 4.0.)

Comparison No. 5

A paint composition of Comparison 5 was obtained in the same manner as with Example 3, except that the paint was dispersed using isopropyl alcohol. This paint composition was applied by spray coating to three base sheets of SUS304 stainless steel in the same manner as with Example 3 in a booth at a temperature of 27° C. and humidity of 70%. When an attempt was made to move the painted samples to a drying oven heated to 100° C., dew condensation took place on the paint-film surface, causing pockmarks on the paint film.

(1) The heat-resistant paint composition according to the present invention, in which inorganic pigment having fine primary particles with hiding power is blended as dispersed slurry, the volume ratio of pigment is less than that of the bonding matrix, that is, not more than 40 vol. % of the paint film, and the size of pores remaining in the paint film is small enough not to scatter visible light rays, can provide a heat-resistant paint film that has a gloss hitherto unavailable with conventional heat-resistant paints, and can provide a glossy paint film with one-coat and one-bake.

(2) The heat-resistant paint composition according to the present invention is suitable for use with hard-to-rust austenitic stainless steel or aluminum material, and when applied to austenitic stainless steel material, such as SUS304 stainless steel, is capable of withstanding high temperatures up to 800° C., depending on pigments used.

(3) Since a high-boiling organic solvent is mixed in the heat-resistant paint composition according to the present invention, dew condensation is hardly caused by moisture during application, and a glossy paint film can be easily formed. In particular, when ethyl cellosolve is added to the paint as a dispersion medium of pigment, the paint film does not give off strong or offensive odor, pigments are dispersed effectively in the paint, and a high-gloss paint film can be easily formed.

What is claimed is:

1. A high-gloss, heat-resistant paint composition prepared by combining inorganic pigment powder having hiding power with a binder solution chiefly consisting of an alcoholic solution of polysilicon alkoxide wherein said binder solution contains an effective amount of an aluminum ingredient, said composition contains 8–50 wt. % of a hydrophilic organic solvent having a boiling point of not less than 100° C. and not more than 220° C., the average particle size of primary particles of said inorganic pigment powder dispersed in said binder solution is not more than 0.3 μm, and a solidified paint film after said composition has been dried and baked contains no less than 60 vol. % of a solidified vitreous matrix formed as the result of solidification of binder content.

2. A high-gloss, heat-resistant paint composition as set forth in claim 1 wherein when the average thickness of a paint film obtained by applying said composition to an object being painted is 10 μm, said composition contains inorganic pigment powder of an amount enough to form a paint film having hiding power.

3. A high-gloss, heat-resistant paint composition as set forth in claim 1 wherein when a paint film having an average film thickness of 4–20 μm is formed by applying by spray coating said composition to the surface of an object having a surface roughness obtained by blast-finishing with grit of 270 mesh or finer, a gloss value of said paint film measured at the reflection angle of 60 degrees is not less than 30%.

4. A high-gloss, heat-resistant paint composition as set forth in claim 1 wherein said vitreous matrix contains 10–45 wt. % of $Al_2O_3$ content.

5. A high-gloss, heat-resistant paint composition as set forth in claim 1 wherein said inorganic pigment powder comprises primary particles of oxides having an average particle size of not more than 0.2 μm.

6. A high-gloss, heat-resistant paint composition as set forth in claim 1 wherein said hydrophilic organic solvent is alcohol.

7. A high-gloss, heat-resistant paint composition as set forth in claim 1 wherein 2~10 wt. % of inorganic pigment having hiding power is replaced with ultrafine alumina powder having primary-particle size of not more than 35 nm.

8. A method for manufacturing a high-gloss, heat-resistant paint composition which comprises processing a slurry mixture obtained by adding a hydrophilic organic solvent having a boiling point of not less than 100° C. and not more than 220° C. to inorganic pigment powder having hiding power using a dispersion means, said pigment comprises primary particles having an average particle size of not more than 0.3 $\mu$m and secondary particles, wherein said dispersion means reduces said secondary particles to primary particles; and mixing said slurry with a binder solution chiefly consisting of an alcoholic solution of polysilicon alkoxide and an effective amount of aluminum.

9. A method for manufacturing a high-gloss, heat-resistant paint composition as set forth in claim 8, wherein an effective amount of dispersant is added to said slurry mixture of hydrophilic organic solvent and inorganic pigment powder.

10. A method for applying by spray coating a high-gloss, heat resistant paint manufacture by forming a slurry mixture obtained by mixing inorganic pigment powder having hiding power, in which the average particle size of primary particles thereof is not more than 0.3 $\mu$m, with hydrophilic organic solvent having a boiling point of not less than 100° C. and not more than 220° C. and subjecting said slurry mixture to dispersion processing with a binder solution consisting of an alcoholic solution of polysilicon alkoxide containing an effective amount of aluminum ingredient to an object being painted whose surface has been blast-finished with grit of a particle size equal to, or finer than 270 mesh; said painted object being heat-treated to form a paint film having an average film thickness of not less than 4 $\mu$m and not more than 20 $\mu$m on the surface of said painted object.

11. A method for applying a high-gloss, heat-resistant paint as set forth in claim 10 wherein humidity in a spray coating booth is kept at not more than 65%.

12. A method for applying a high-gloss, heat-resistant paint as set forth in claim 10 wherein the surface of paint film is quick-dried by blowing dry hot air to said object immediately after spray coating, and then said paint film is baked.

13. A high-gloss, heat-resistant paint film formed by applying by spray coating a heat-resistant paint composition to a surface of an object being painted; the surface of said object being blast-finished with grit having a particle size equal to, or finer than 270 mesh; said paint film being a one-coat film having an average thickness of not less than 4 $\mu$m and not more than 20 $\mu$m comprising a vitreous matrix formed as the result of solidification of a binder solution consisting of an alcoholic solution of polysilicon alkoxide containing an effective amount of aluminum ingredient and inorganic pigment powder having hiding power consisting of primary particles of an average particle size of not more than 0.3 $\mu$m dispersed in said matrix; said vitreous matrix accounting for not less than 60 vol. % of said paint film; and a gloss value of said paint film measured at the reflection angle of 60 degrees being not less than 30%.

14. A high-gloss, heat-resistant paint film as set forth in claim 13 wherein said object being painted is made of austenitic stainless steel.

15. A high-gloss, heat-resistant paint film as set forth in claim 13 wherein said paint film formed by spray coating on the blast-finished surface of said object made of a 1 mm-thick SUS stainless steel sheet, and when held at 650° C. for six hours in an electric furnace of air atmosphere has a gloss value at the reflection angle of 60° of not less than 25%, and has an adhesion as not to cause peeling that can be identified by the naked eye on said paint film when said sheet is bent about 90 degrees.

* * * * *